(12) United States Patent
Hosoi et al.

(10) Patent No.: US 6,278,436 B1
(45) Date of Patent: *Aug. 21, 2001

(54) BRIGHTNESS CONTROLLING APPARATUS

(75) Inventors: Kenichiro Hosoi; Nozomu Kikuchi, both of Fukuroi (JP)

(73) Assignee: Pioneer Electronic Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,822

(22) Filed: Jun. 25, 1998

(30) Foreign Application Priority Data

Jun. 27, 1997 (JP) .................................. 9-187827

(51) Int. Cl.⁷ ..................................... G09G 5/10
(52) U.S. Cl. .......................... 345/147; 345/138; 345/63
(58) Field of Search ............................. 345/63, 147, 148, 345/138, 149, 688, 20, 687, 671, 673

(56) References Cited

U.S. PATENT DOCUMENTS

| | | | |
|---|---|---|---|
| 3,441,670 | * 4/1969 | Loughlin | 345/138 |
| 3,996,421 | * 12/1976 | Pruznick et al. | 178/7.3 D |
| 5,049,989 | * 9/1991 | Tsuji | 358/98 |
| 5,155,586 | * 10/1992 | Levy et al. | 358/54 |
| 5,191,421 | * 3/1993 | Hwang | 358/168 |
| 5,298,915 | * 3/1994 | Bassetti, Jr. | 345/149 |
| 5,760,760 | * 6/1998 | Helms | 345/102 |
| 5,933,130 | * 8/1999 | Wagner | 345/147 |

* cited by examiner

Primary Examiner—Richard Hjerpe
Assistant Examiner—Kimnhung Nguyen
(74) Attorney, Agent, or Firm—Pitney, Hardin, Kipp & Szuch LLP

(57) ABSTRACT

A brightness controlling apparatus adjusts a brightness level of a video signal inputted thereto and outputting the video signal having the adjusted brightness level to a display apparatus so that the display apparatus displays a video image corresponding to the video signal on the basis of the video signal having the adjusted brightness level. The brightness controlling apparatus is provided with: an average brightness level detecting device for detecting average brightness levels of the video signal in a plurality of blocks respectively, the blocks being obtained by dividing the video signal to be displayed on a picture plane by the display apparatus into the blocks; an average brightness level adding device for adding to each other the average brightness levels of the video signal in at least two of the blocks at a vicinity of each other for each of the blocks, which are detected by the average brightness level detecting device; a brightness level setting device for setting the brightness level of the video signal on the basis of the added average brightness levels added by the average brightness level adding device; and an outputting device for outputting the video signal having the brightness level set by the brightness level setting device to the display apparatus as the video signal having the adjusted brightness level.

15 Claims, 6 Drawing Sheets

FIG. 4(a)

| 1 | 128/255 |
|---|---|
| 2 | 200/255 |
| 3 | 128/255 |
| 4 | 200/255 |
| 5 | 128/255 |
| 6 | 200/255 |
| 7 | 128/255 |
| 8 | 200/255 |

FIG. 4(b)

| 1 | 128/255 |
|---|---|
| 2 | 128/255 |
| 3 | 128/255 |
| 4 | 200/255 |
| 5 | 200/255 |
| 6 | 128/255 |
| 7 | 128/255 |
| 8 | 200/255 |

FIG. 4(c)

| 1 | 64/255 |
|---|---|
| 2 | 64/255 |
| 3 | 64/255 |
| 4 | 100/255 |
| 5 | 100/255 |
| 6 | 64/255 |
| 7 | 64/255 |
| 8 | 64/255 |

FIG. 5

| 1 | 2 | 3 | 4 |
|---|---|---|---|
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |

FIG. 6(a)

| | |
|---|---|
| 1 | 128/255 |
| 2 | 128/255 |
| 3 | 128/255 |
| 4 | 200/255 |
| 5 | 128/255 |
| 6 | 128/255 |
| 7 | 128/255 |
| 8 | 128/255 |

FIG. 6(b)

| | |
|---|---|
| 1 | 64/255 |
| 2 | 64/255 |
| 3 | 64/255 |
| 4 | 100/255 |
| 5 | 64/255 |
| 6 | 64/255 |
| 7 | 64/255 |
| 8 | 64/255 |

BRIGHTNESS CONTROLLING APPARATUS

BACKGROUND OF THE INVENTION

1. Field of the Invention

The present invention relates to a brightness controlling apparatus for controlling a brightness of a video signal.

2. Description of the Related Art

There is a plasma display panel as a 2-dimensional image display apparatus of thin type. Among them, a plasma display panel of AC discharging type having a memory function is being developed.

In a display apparatus equipped with such a plasma display panel of AC discharging type, a signal processing unit processes a so-called composite video signal as an input signal. Then, a display unit including the plasma display panel receives a driving signal from the signal processing unit, so that the plasma display panel displays a video image on a 2-dimensional picture plane.

More concretely, this signal processing unit has an A/D (Analog to Digital) converting circuit, which converts the composite video signal as an input signal into pixel data. The pixel data is outputted from the A/D converter through a frame memory, an output processing circuit etc. to the display unit. The plasma display panel in the display unit includes row (i.e., vertical line) electrodes, and line (i.e., horizontal line) electrodes. As the pixel data is inputted to a row electrode driver in the display unit, the row electrodes are driven by the row electrode driver, which generates and supplies pixel data pulse based on the pixel data to the row electrodes respectively. On the other hand, the line electrodes are driven by a line electrode driver in the display unit, which generates and supplies scanning pulse etc., in synchronization with the pixel data pulse, to the line electrodes respectively. When the voltage difference is applied to each pixel located at an intersection of the row electrode and the line electrode respectively where a dielectric substance is interposed between the row electrode and the line electrode, the discharging light emission is caused at each pixel. Then, the discharging light emission is repeatedly performed by an application of a pulse to keep the discharge with a barrier charge in the dielectric substance. When a pulse to erase the barrier charge in the dielectric substance is applied to the line electrodes, the discharging light emission is stopped. In this manner, by the timing of applying this pulse to erase the barrier charge, the brightness of the discharge light emission can be controlled.

In the above described driving operation of the plasma display panel, a so-called ABL (Automatic Brightness/Beam Limiter) is employed to limit the brightness according to the video signal. The ABL is constructed such that the whole display picture plane is divided into a plurality of blocks and it limits the brightness of the whole frame of the video image or picture when an APL (Average Picture Level), which is the average value of the brightness signals of the video image in each block, in just one block exceeds a standard value.

The operation of the ABL is explained with reference to FIG. 6(a) and FIG. 6(b). As shown in FIG. 6(a), it is assumed that the gradations of the brightness are 0 to 255 gradations, one picture plane consists of 8 blocks divided with respect to a vertical direction, and the brightness signal level is controlled or limited to be ½ when the gradation of any block exceeds the APL 144 as the standard level to actuate the ABL, for example. At this time, in case that each of the 1$^{st}$ to 3$^{rd}$ blocks of the inputted video image has the gradation of the APL 128, the 4$^{th}$ block has the gradation of the APL 200, each of the 5$^{th}$ to 8$^{th}$ blocks has the gradation of the APL 200, since the gradation of the 4$^{th}$ block (which has the brightness of the APL 200) exceeds the APL 144 as the standard value, the ABL is actuated for all of the signals of the whole one picture plane. Thus, the gradations of the brightness signals of all blocks become the APL display gradations as shown in FIG. 6(b).

Namely, even if the gradation of just one block exceeds the standard APL, the ABL is actuated. Therefore, a case often occurs where the whole picture plane becomes dark.

In this manner, according to the above described brightness controlling apparatus, since the ABL is actuated even for such a video image or picture that the bright portion is dispersed on the picture plane and that the bright portions are relatively just rare and local on the video image or the picture plane, the whole picture plane becomes dark. For example, even in case of the picture having the pattern shown in FIG. 6(a), the ABL is actuated so that the whole picture plane becomes dark (on the basis of the bright signals shown in FIG. 6(b)), which is a serious problem in a practical sense.

SUMMARY OF THE INVENTION

Given these circumstances, it is an object of the present invention to provide a brightness controlling apparatus, which can prevent the picture plane from becoming dark in case that the video image or picture is just locally bright.

The above object of the present invention can be achieved by a first brightness controlling apparatus for adjusting a brightness level of a video signal inputted thereto and outputting the video signal having the adjusted brightness level to a display apparatus so that the display apparatus displays a video image corresponding to the video signal on the basis of the video signal having the adjusted brightness level. The first brightness controlling apparatus of the present invention is provided with: an average brightness level detecting device for detecting average brightness levels of the video signal in a plurality of blocks respectively, the blocks being obtained by dividing the video signal to be displayed on a picture plane by the display apparatus into the blocks; an average brightness level adding device for adding to each other the average brightness levels of the video signal in at least two of the blocks at a vicinity of each other for each of the blocks, which are detected by the average brightness level detecting device; a brightness level setting device for setting the brightness level of the video signal on the basis of the added average brightness levels added by the average brightness level adding device; and an outputting device for outputting the video signal having the brightness level set by the brightness level setting device to the display apparatus as the video signal having the adjusted brightness level.

According to the first brightness controlling apparatus, the average brightness levels of the video signal in a plurality of blocks are detected by the average brightness level detecting device, respectively. Then, the average brightness levels of the video signal in at least two of the blocks at a vicinity of each other are added to each other by the average brightness level adding device, for each of the blocks. Then, the brightness level of the video signal is set by the brightness level setting device, on the basis of the added average brightness levels. Finally, the video signal having the brightness level set by the brightness level setting device is outputted by the outputting device, to the display apparatus as the video signal having the adjusted brightness level.

Accordingly, the display apparatus displays the video image corresponding to the video signal, on the basis of the video signal having the adjusted brightness level.

Therefore, since the first brightness controlling apparatus adjusts the brightness level on the basis of the average brightness levels as for the certain number of blocks, in case that the video image is just locally bright, the brightness level is not controlled or adjusted. On the other hand, in case that the adjustment for the brightness of the video image is really desired or required, the brightness level is certainly controlled or adjusted by the first brightness controlling apparatus, so that it is possible to prevent the display apparatus (e.g., the plasma display panel) from being destroyed or damaged due to the high brightness.

In one aspect of the first brightness controlling apparatus, the blocks comprise blocks obtained by dividing the video signal to be displayed on the picture plane in a vertical direction.

In another aspect of the first brightness controlling apparatus, the blocks comprise blocks obtained by dividing the video signal to be displayed on the picture plane in a horizontal direction.

In another aspect of the first brightness controlling apparatus, the blocks comprise blocks obtained by dividing the video signal to be displayed on the picture plane in both of vertical and horizontal directions.

In another aspect of the first brightness controlling apparatus, the brightness level setting device gradually varies the brightness level in correspondence with the added average brightness levels. Thus, it is possible to control or adjust the brightness level of the displayed video image gradually, so that the change in the brightness level on the display apparatus can be hardly recognized by the viewer or audience.

In another aspect of the first brightness controlling apparatus, the average brightness level adding device adds to each other the average brightness levels of the video signal in at least two of the blocks adjacent to each other. Thus, the adding operation can be relatively easily and promptly performed by the average brightness level adding device.

In another aspect of the first brightness controlling apparatus, the average brightness level adding device adds the average brightness level of the video signal in one of the blocks to the average brightness levels of the video signal in another blocks surrounding the one of the blocks. Thus, the possibility that the unnecessary brightness control is actuated due to the locally bright portion on the picture plane can be reduced.

In another aspect of the first brightness controlling apparatus, the outputting device includes a multiplier for multiplying the inputted video signal with the brightness level set by the brightness level setting device. Thus, the inputted video signal can be rather easily processed to be the output video signal having the adjusted brightness level by virtue of the multiplier.

The above object of the present invention can be also achieved by a second brightness controlling apparatus provided with: an A/D converting device for converting RGB analog color signals carrying a video signal to RGB digital color signals respectively; a synthesizing device for synthesizing the RGB digital color signals to output a brightness signal corresponding to the RGB digital color signals; an average brightness level detecting device for detecting average brightness levels of the brightness signal in a plurality of blocks respectively, the blocks being obtained by dividing the brightness signal to be displayed on a picture plane by the display apparatus into the blocks; an average brightness level adding device for adding to each other the average brightness levels of the video signal in at least two of the blocks at a vicinity of each other for each of the blocks, which are detected by the average brightness level detecting device; a comparing device for comparing the average brightness levels added by the average brightness level adding device with a predetermined reference value; a multiplication coefficient setting device for setting the multiplication coefficient on the basis of a comparison result of the comparing device; and a multiplying device for multiplying the RGB digital color signals outputted from the A/D converting device with the multiplication coefficient set by the multiplication coefficient setting device respectively, and outputting the multiplied signals to a display apparatus so that the display apparatus displays a video image corresponding to the RGB digital color signals on the basis of the multiplied RGB digital color signals.

According to the second brightness controlling apparatus of the present invention, the RGB analog color signals are converted by the A/D converting device, to RGB digital color signals, respectively. Then, the RGB digital color signals are synthesized by the synthesizing device, and the brightness signal corresponding to the RGB digital color signals is outputted. Then, the average brightness levels of the brightness signal in a plurality of blocks are detected by the average brightness level detecting device, respectively. Then, the average brightness levels of the video signal in at least two of the blocks at a vicinity of each other are added to each other by the average brightness level adding device, for each of the blocks. Then, the average brightness levels added by the average brightness level adding device is compared with the predetermined reference value by the comparing device. Then, the multiplication coefficient is set by the multiplication coefficient setting device, on the basis of the comparison result of the comparing device. Finally, the RGB digital color signals outputted from the A/D converting device are multiplied with the multiplication coefficient set by the multiplication coefficient setting device by the multiplying device, respectively. Thus, the multiplied signals are outputted to the display apparatus. Accordingly, the display apparatus displays the video image corresponding to the RGB analog color signals, on the basis of the RGB digital color signals having the adjusted brightness levels.

Therefore, in case that the video image is just locally bright, the brightness level is not controlled or adjusted. On the other hand, in case that the adjustment for the brightness of the video image is really desired or required, the brightness level is certainly controlled or adjusted by the second brightness controlling apparatus, so that it is possible to prevent the display apparatus (e.g., the plasma display panel) from being destroyed or damaged due to the high brightness.

In one aspect of the second brightness controlling apparatus, the blocks comprise blocks obtained by dividing the brightness signal to be displayed on the picture plane in a vertical direction.

In another aspect of the second brightness controlling apparatus, the blocks comprise blocks obtained by dividing the brightness signal to be displayed on the picture plane in a horizontal direction.

In another aspect of the second brightness controlling apparatus, the blocks comprise blocks obtained by dividing the brightness signal to be displayed on the picture plane in both of vertical and horizontal directions.

In another aspect of the second brightness controlling apparatus, the brightness level setting device gradually varies the brightness level in correspondence with the added average brightness levels. Thus, it is possible to control or adjust the brightness level of the displayed video image gradually, so that the change in the brightness level on the display apparatus can be hardly recognized by the viewer or audience.

In another aspect of the second brightness controlling apparatus, the average brightness level adding device adds to each other the average brightness levels of the brightness signal in at least two of the blocks adjacent to each other. Thus, the adding operation can be relatively easily and promptly performed by the average brightness level adding device.

In another aspect of the second brightness controlling apparatus, the average brightness level adding device adds the average brightness level of the brightness signal in one of the blocks to the average brightness levels of the brightness signal in another blocks surrounding the one of the blocks. Thus, the possibility that the unnecessary brightness control is actuated due to the locally bright portion on the picture plane can be reduced.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 4, consisting of FIGS. 4(a), 4(b) and 4(c), are diagrams for explaining one operation of the ABL of the embodiment.

FIG. 5 is a diagram for explaining another operation of the ABL of the embodiment.

FIG. 6, consisting of FIGS. 6(a) and 6(b), are diagrams for explaining the operation of an ABL according to the related art.

DETAILED DESCRIPTION OF THE PREFERRED EMBODIMENT

Figure 1:
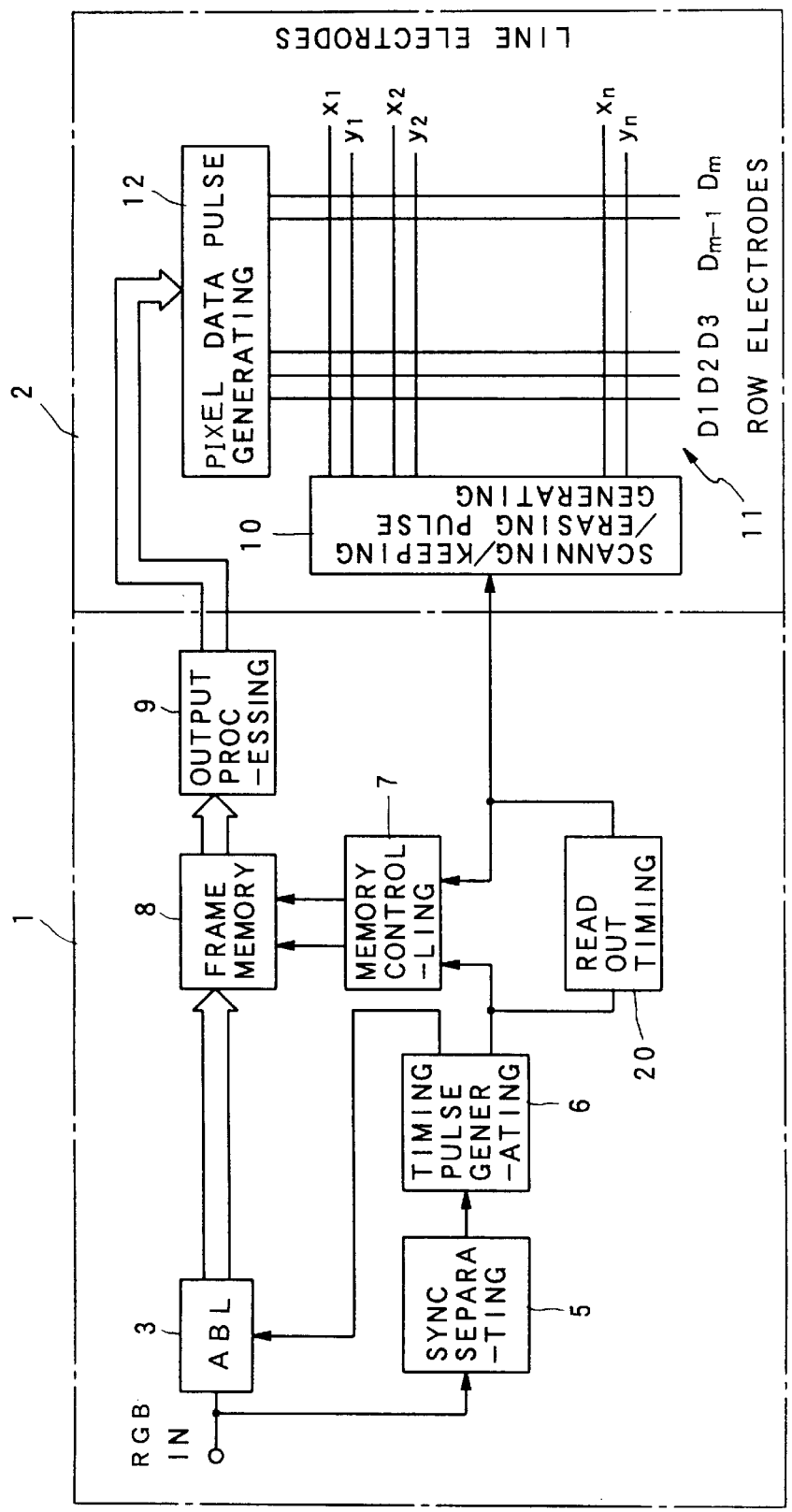
FIG. 1 is a block diagram showing a structure of a display apparatus including a plasma display panel and an ABL of an embodiment of the present invention.

FIG. 1 shows a structure of a display apparatus including a plasma display panel and an ABL of an embodiment of the present invention.

The display apparatus is provided with: a signal processing unit 1 for processing RGB (Red, Green, Blue) analog color signals as input signals carrying a video signal; and a display unit 2 for receiving a driving signal from the signal processing unit 1 and displaying a video image on a 2-dimensional picture plane.

The signal processing unit 1 is provided with an ABL (Automatic Brightness/Beam Limiter) 3, a synchronization (SYNC) separating circuit 5, a timing pulse generating circuit 6, a memory controlling circuit 7, a frame memory 8, an output processing circuit 9 and a read out timing circuit 20.

The displaying unit 2 is provided with a scanning/keeping/erasing pulse generating circuit 10, an image data pulse generating circuit 12, and a plasma display panel 11.

In the signal processing unit 1, the A/D converters, which are included in the ABL 3 described later in detail, convert the inputted RGB analog color signals into pixel data respectively. On the other hand, the timing pulse generating circuit 6 generates various timing pulses on the basis of horizontal and vertical synchronization signals extracted from the inputted RGB analog color signals by the synchronization separating circuit 5. The A/D converter in the ABL 3 operates in synchronization with these timing pulses.

The memory controlling circuit 7 supplies writing and reading pulses synchronous with the timing pulses from the timing pulse generating circuit 6 to the frame memory 8, takes the pixel data from the ABL 3 sequentially into the frame memory 8 while sequentially reading out therefrom to the output processing circuit 9 at the next stage. The output processing circuit 9 supplies the pixel data to the pixel data pulse generating circuit 12 in synchronization with the timing pulses from the timing pulse generating circuit 6.

The plasma display panel 11 includes row (i.e., vertical line) electrodes D1, D2, D3, . . . , Dm−1 and Dm, and line (i.e., horizontal line) electrodes x1, x2, x3, . . . , xn−1 and xn, and y1, y2, y3, . . . , yn−1 and yn. One pair of xi and yi constructs one line respectively.

The row electrodes Di and the line electrodes xi and yi are constructed to sandwich a dielectric substance not shown therebetween. The scanning/keeping/erasing pulse generating circuit 10 applies a scanning pulse having a voltage to start a discharge to each of the line electrodes xi (i=1 to n) of the plasma display panel 11 in response to the timing pulses from the timing pulse generating circuit 6.

On the other hand, the scanning/keeping/erasing pulse generating circuit 10 generates a keeping pulse having a voltage to keep the discharging condition in response to the timing pulses from the timing pulse generating circuit 6, and applies it to the line electrodes y1 to yn and the line electrodes x1 to xn of the plasma display panel 11.

At this time, the keeping pulse is applied such that the timing applied to the line electrode x1 to xn and the timing applied to the line electrodes y1 to yn are shifted to each other.

Further, the scanning/keeping/erasing pulse generating circuit 10 applies a discharge erasing pulse to erase or stop the discharging condition to the line electrodes x1 to xn of the plasma display panel 11 in response to the timing pulse from the timing pulse generating circuit 6. On the other hand, the pixel data pulse generating circuit 12 generates a pixel data pulse corresponding to each pixel data supplied from the output processing circuit 9, and applies it to the row electrodes D1 to Dm respectively. The read out timing circuit 20 generates a read out timing from the frame memory 8 on the basis of the signal from the timing pulse generating circuit 6.

Figure 2:
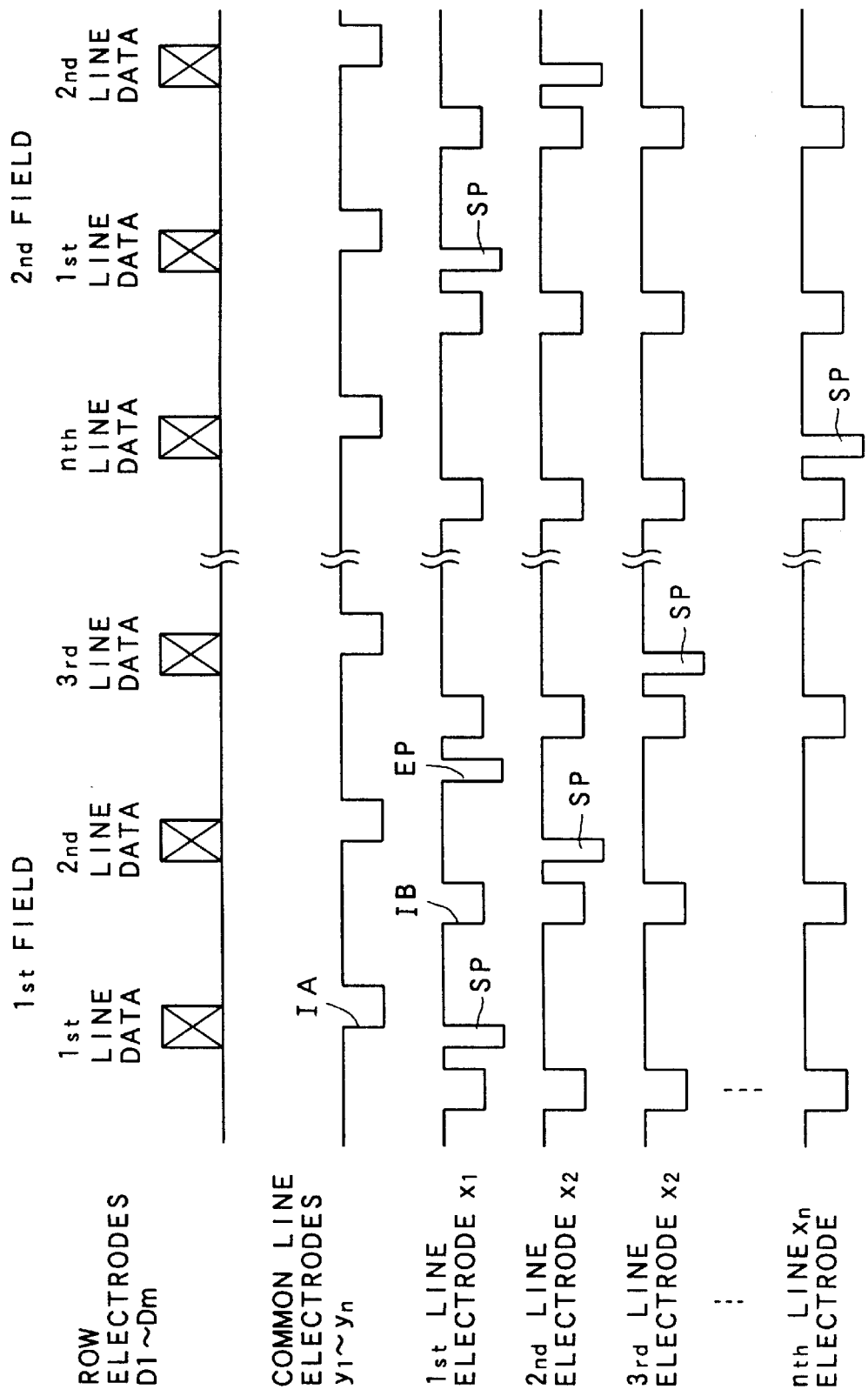
FIG. 2 is a timing diagram for explaining an operation of the display apparatus of FIG. 1.

Next, the driving operation of the plasma display panel 11 in the above explained construction is explained with reference to FIG. 2. At first, the pixel data pulse generating circuit 12 applies the pixel data pulse in a positive polarity corresponding to the pixel data in each line unit to the row electrodes D1 to Dm respectively. The scanning/keeping/erasing pulse generating circuit 10 applies a keeping pulse IA in a negative polarity to the line electrodes y1 to yn respectively at the same timing to each other.

Further, the scanning/keeping/erasing pulse generating circuit 10 applies a keeping pulse IB in a negative polarity to the line electrodes x1 to xn respectively at the same timing to each other, and applies a scanning pulse SP in a negative polarity in synchronization with the applying timing of the above mentioned pixel data pulse during the time period while the keeping pulse IA or IB is not applied.

At the "line" to which the scanning pulse SP in the negative polarity and the pixel data pulse in the positive polarity are simultaneously applied, the discharge is caused since the voltage difference between the scanning pulse SP and the pixel data pulse exceeds a discharge starting voltage, to emit a light.

Therefore, the discharging light emission is caused only at the line to which the scanning pulse SP is applied. Here, although the above explained discharge is completed at a moment notice, since the voltage due to the scanning pulse SP and the pixel data pulse is applied during a predetermined time period after this completion of the discharge, a barrier electric charge is formed as the electric charge generated by the discharge remains at a boundary between the dielectric substance and the electrodes. Since the barrier electric charge exists within the dielectric substance, the discharge is caused again at a voltage lower than the aforementioned discharge starting voltage.

Therefore, after the completion of the discharge due to the scanning pulse SP, the discharge due to the keeping pulse IA applied to the line electrode yi is generated again. Although this re-discharge is also completed at a moment notice, since the keeping pulses IA and B are alternatively applied to the line electrodes xi and yi as shown in FIG. 2, the discharges are repeatedly performed so as to keep the light emission condition of the pixels. When the erasing pulse EP is applied to the line electrode xi, the barrier charge within the dielectric substance is erased, so that the discharge is not caused again even if the keeping pulse is applied after that. Thus, by the timing of applying the erasing pulse EP, the brightness of the discharge light emission can be controlled.

The above described operation sequentially for the $1^{st}$ line to $n^{th}$ line is performed to write the pixel data in the amount of 1 field of the pixels per line. After the writing operation for the $n^{th}$ line which is the final line is completed, the writing operation of the pixels for the next field is started from the $1^{st}$ line thereof.

In the above described driving operation of the plasma display panel, the ABL 3 limits the brightness according to the RGB analog color signals.

Next, the structure as well as the operation of the ABL 3 will be explained with reference to FIGS. 3 to 5.

Figure 3:
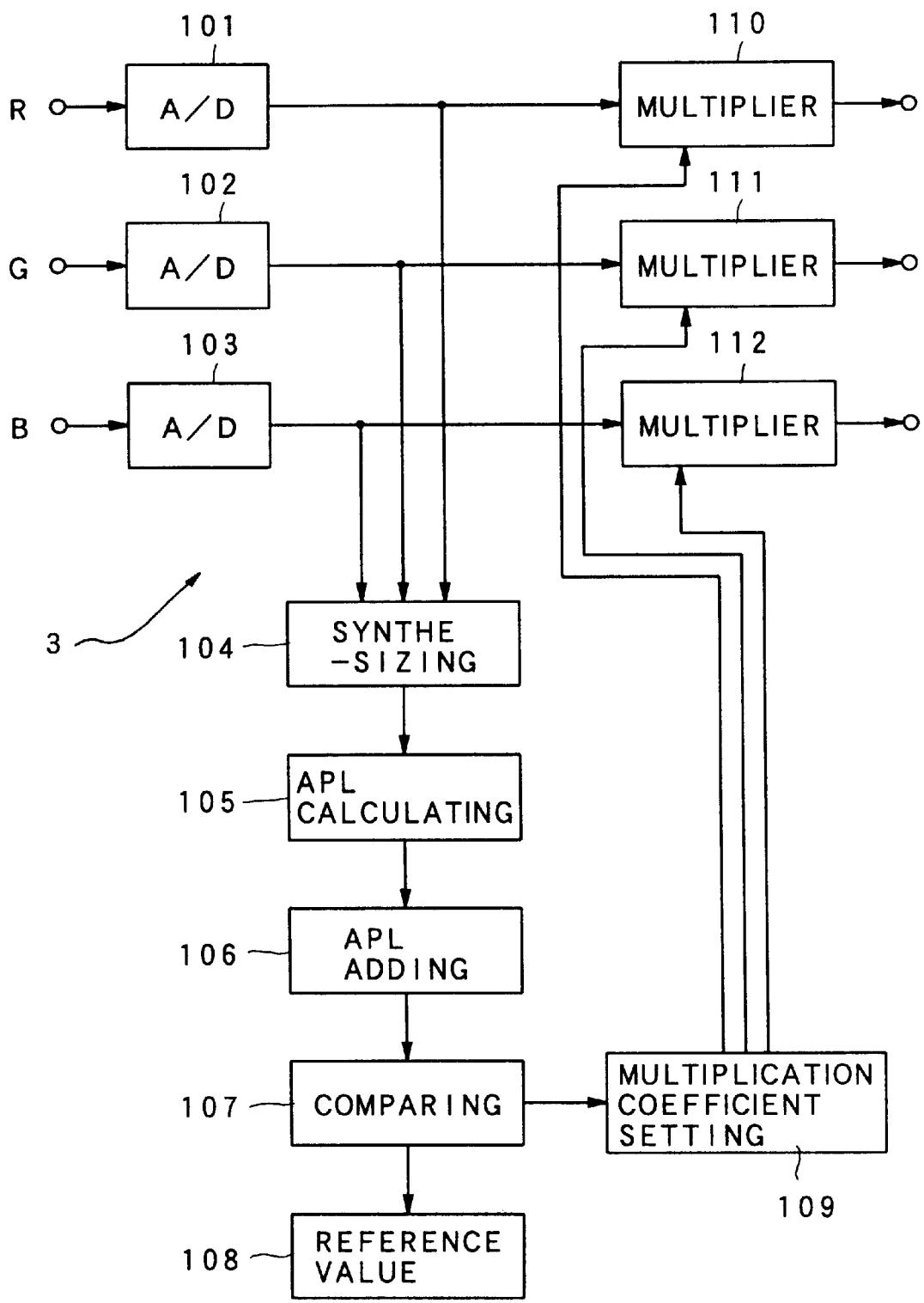
FIG. 3 is a block diagram of the ABL of the embodiment.

FIG. 3 is a block diagram of the ABL 3 in the present embodiment.

In FIG. 3, the ABL 3 is provided with: A/D (Analog to Digital) converters 101 to 103 for converting the RGB analog color signals as the input signals corresponding to respective RGB colors carrying the video signal, into RGB digital color signals respectively; a synthesizing circuit 104 for synthesizing the RGB digital color signals from the A/D converters 101 to 103 into one synthesized brightness signal; an APL (Average Picture Level) calculating circuit 105 for calculating the APL from the synthesized brightness signal outputted from the synthesizing circuit 104; an APL adding circuit 106 for adding the calculated APL outputted from the APL calculating circuit 105; a comparing circuit 107 for comparing the added result of the APL outputted from the APL adding circuit 106 and a reference value outputted from a reference value generator 108; the reference value generator 108 for generating the reference value; a multiplication coefficient setting circuit 109 for setting a multiplication coefficient on the basis of the comparison result of the comparing circuit 107; and multipliers 110 to 112 for multiplying the RGB digital color signals from the A/D converters 101 to 103 with the multiplication coefficient of the multiplication coefficient setting circuit 109 respectively.

Next, the operation of the ABL 3 is explained with reference to FIGS. 3 and 4.

In FIG. 3, the inputted RGB analog color signals corresponding to RGB colors respectively are converted into the RGB digital color signals by the A/D converters 101 to 103 respectively. Then, the converted RGB digital color signals are synthesized into one brightness signal, which indicates a brightness corresponding to the input signals by the synthesizing circuit 104, and is inputted to the APL calculating circuit 105. Then, by the APL calculating circuit 105, the APL for each of 8 blocks, which is obtained by dividing the video signal of one picture plane by 8 in a vertical direction of the picture plane. For example, if the picture plane corresponds to 480 dots in the vertical direction, the APL is calculated by integrating the video signal synthesized for each 60 dots in the vertical direction. Such a calculation of the APL for each block may be performed by storing the digital brightness signal outputted from the synthesizing circuit 104 into a memory, and by integrating the stored signals by the APL calculating circuit 105.

Assuming that there are 0 to 255 gradations i.e. the number of the gradations in the brightness is 256, the APL for each block is set in the range of 0 to 255 gradations. Two APLs in two blocks adjacent to each other, which have been calculated by the APL calculating circuit 105 in this manner, are added to each other by the APL adding circuit 106. For example, in case of 8 blocks, 7 added values of the APLs are obtained in total (i.e. the added value of the APLs in the $1^{st}$ block and the $2^{nd}$ block, the added value of the APLs in the $2^{nd}$ block and the $3^{rd}$ block, . . . , the added value of the APLs in the $7^{th}$ block and the $8^{th}$ block). Each of these added values are compared with the predetermined reference value (e.g., 400 gradation) which is set by the reference value generator 108.

If at least one of the added values exceeds the reference value generated by the reference value generator 108 as a result of the comparison by the comparing circuit 107, the multiplication coefficient of the multiplication coefficient setting circuit 109 is set to a predetermined value less than 1. Then, this set multiplication coefficient is multiplied with each of the RGB digital color signals by the multipliers 110 to 112 respectively.

Namely, the multiplication coefficient set in the multiplication coefficient setting circuit 109 is read out, and is multiplied with each of the RGB digital color signals by the multipliers 110 to 112. On the other hand, if any one of the added values does not exceed the reference value generated by the reference value generator 108 as a result of the comparison by the comparing circuit 107, the multiplication coefficient of the multiplication coefficient setting circuit 109 is set to 1, so that no brightness control is performed.

According to the present embodiment, in case of a pattern of the APLs in the 8 blocks shown in FIG. 4 (a), since all of the added values of the adjacent APLs are less than 400, the brightness control is not performed. On the other hand, in case of a pattern of the APLs shown in FIG. 4(b), since at least one of the added values of the adjacent APLs is greater than 400 (i.e., the $4^{th}$ and $5^{th}$ blocks), the multiplication coefficient is set to 0.5, so that the brightness control is performed as shown in FIG. 4(c) by multiplying each of the RGB digital color signal with this multiplication coefficient of 0.5.

By the way, in case that one field is divided into a plurality of blocks as shown in FIGS. 4(a) to 4(c), if the line electrodes of the plasma display panel 11 are driven in the aforementioned manner (refer to FIGS. 1 and 2), a plurality of driver ICs (Integrated Circuits) for driving the panel in which the driver circuits (e.g., the pixel data pulse generating circuit 12 and the scanning/keeping/erasing pulse generating circuit 10) may be prepared, and that the line electrodes within each block may be driven by respective one of the driver ICs. Namely, in the embodiment shown in FIGS. 4(a) to 4(c), 8 driver ICs may be prepared, and that the line electrodes within each of the $1^{st}$ to $8^{th}$ blocks may be driven by respective one of the 8 driver ICs.

At this time, in case that the heat radiation for the driver ICs is executed by installing a heat radiation plate to each of pairs of the adjacent driver ICs (i.e., the driver ICs for the $1^{st}$ and $2^{nd}$ blocks, the $3^{rd}$ and $4^{th}$ blocks, the $5^{th}$ and $6^{th}$ blocks, the $7^{th}$ and $8^{th}$ blocks), if there are some blocks whose APLs are large are dispersed as shown in FIG. 4 (a), just one pair of the driver ICs corresponding the large APL among those pairs of the driver ICs fixed on the heat radiation plate becomes large in its heating or caloric value. In such a situation, although there is an enough heat radiation capability by the heat radiation plate, the ABL is actuated and the brightness is lowered according to the aforementioned related art (refer to FIGS. 6(a) and (b)), resulting in that the whole picture plane becomes dark, which is a problem.

Therefore, in the present embodiment, the ABL is actuated only when both of the APLs of the two adjacent blocks (e.g., the $1^{st}$ and $2^{nd}$ blocks, the $3^{rd}$ and $4^{th}$ blocks, the $5^{th}$ and $6^{th}$ blocks, and the $7^{th}$ and $8^{th}$ blocks) which are driven by one pair of the driver ICs fixed to the heat radiation plate. Therefore, it is possible to prevent the heat radiation capability from approaching its limit because the heating or caloric value from one pair of the driver ICs fixed to the heat radiation plate is increased. Thus, it is possible to prevent the driver ICs from being destroyed or damaged as the heating or caloric value is decreased because the brightness is lowered when the heating or caloric value is nearly exceeding a predetermined tolerance limit.

In the above described embodiment, the picture plane is divided into blocks in the vertical direction. However, the present invention is not limited to this. For example, the picture plane may be divided into blocks in a horizontal direction. Alternatively, the picture plane may be divided into both of the vertical and horizontal directions into a matrix shape. Further, although the added value of the APL is compared with the reference value, it is also possible to compare an averaged value of the added values with the reference value.

Furthermore, in place of the addition of the two APLs of the adjacent two blocks, the addition of the three or more than three APLs of the adjacent blocks may be employed. Alternatively, as shown in FIG. 5, the picture plane may be divided into 8 blocks in the vertical direction and into 4 blocks in the horizontal direction, so that the picture plane be divided into 8×4 =32 blocks, and the APL of one block and the APLs around of the one block may be added. For, example, with respect to the block 6, the APLs of the $1^{st}$ to $3^{rd}$ blocks, the $5^{th}$ to $7^{th}$ blocks, and the $9^{th}$ to $11^{th}$ blocks are added and compared with the reference value, so that the control for the APL is conducted.

In the above described embodiment, a plurality of reference values may be set in the reference value generator 108, and a plurality of multiplication coefficients are set in correspondence with these set reference values. In such a construction, by comparing the added APL obtained by the APL adding circuit 106 for the blocks with the reference values respectively, by setting the multiplication coefficient in correspondence with the comparison results, and by multiplying the RGB digital color signals with the set multiplication coefficient, it is possible to control the brightness gradually in accordance with the APL.

The brightness control in the present embodiment may be performed uniformly over the whole area of the picture plane or may be performed so that the brightness at the peripheral area of the picture plane be lower than that at the central area of the picture plane, as disclosed in Japanese Patent Application Laid Open No.Hei 06-282241.

As described above in detail, according to the present embodiment, the brightness is controlled by the brightness controlling apparatus with respect to such a video image that the bright portions are not dispersed but are concentrated on the picture plane. It is possible to actuate the brightness controlling apparatus and control the brightness only with respect to the video image which is actually desired to be brightness-controlled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-187827 filed on Jun. 27, 1997 including the specification, claims, drawings and summary is incorporated herein by reference in its entirety.

What is claimed is:

1. A brightness controlling apparatus for adjusting a brightness level of a video signal inputted thereto and outputting the video signal having the adjusted brightness level to a display apparatus so that said display apparatus displays a video image corresponding to the video signal on the basis of the video signal having the adjusted brightness level, said brightness controlling apparatus comprising:

an average brightness level detecting device for detecting average brightness levels of the video signal in a plurality of blocks respectively, said blocks being obtained by dividing the video signal to be displayed on a picture plane by said display apparatus into the blocks;

an average brightness level adding device for adding to each other the average brightness levels of the video signal in at least two of the blocks at a vicinity of each other for each of the blocks, which are detected by said average brightness level detecting device;

a brightness level setting device for setting the brightness level of the video signal on the basis of the added average brightness levels added by said average brightness level adding device; and an outputting device for outputting the video signal having the brightness level set by said brightness level setting device to said display apparatus as the video signal having the adjusted brightness level;

said brightness level setting device limiting the brightness level of the video signal for each frame of the video image on the basis of the added average brightness levels, wherein groups each including the at least two of the blocks adjacent to each other are defined as block groups respectively, said average brightness level adding device adds to each other the average brightness levels in the blocks within respective one of the block groups for each of the block groups, to thereby calculate the added average brightness level for each of the block groups, and said brightness level setting device compares each of the added average brightness levels with a predetermined reference value, to thereby limit the brightness level if the added average brightness level in at least one of the block groups is larger than the predetermined reference value.

2. A brightness controlling apparatus according to claim 1, wherein said blocks comprise blocks obtained by dividing the video signal to be displayed on the picture plane in a vertical direction.

3. A brightness controlling apparatus according to claim 1, wherein said blocks comprise blocks obtained by dividing the video signal to be displayed on the picture plane in a horizontal direction.

4. A brightness controlling apparatus according to claim 1, wherein said blocks comprise blocks obtained by dividing the video signal to be displayed on the picture plane in both of vertical and horizontal directions.

5. A brightness controlling apparatus according to claim 1, wherein said brightness level setting device gradually varies the brightness level in correspondence with the added average brightness levels.

6. A brightness controlling apparatus according to claim 1, wherein said average brightness level adding device adds to each other the average brightness levels of the video signal in at least two of the blocks adjacent to each other.

7. A brightness controlling apparatus according to claim 1, wherein said average brightness level adding device adds the average brightness level of the video signal in one of the blocks to the average brightness levels of the video signal in another blocks surrounding said one of the blocks.

8. A brightness controlling apparatus according to claim 1, wherein said outputting device comprises a multiplier for multiplying the inputted video signal with the brightness level set by said brightness level setting device.

9. A brightness controlling apparatus comprising:

an A/D converting device for converting RGB analog color signals carrying a video signal to RGB digital color signals respectively;

a synthesizing device for synthesizing the RGB digital color signals to output a brightness signal corresponding to the RGB digital color signals;

an average brightness level detecting device for detecting average brightness levels of the brightness signal in a plurality of blocks respectively, said blocks being obtained by dividing the brightness signal to be displayed on a picture plane by said display apparatus into the blocks;

an average brightness level adding device for adding to each other the average brightness levels of the video signal in at least two of the blocks at a vicinity of each other for each of the blocks, which are detected by said average brightness level detecting device;

a comparing device for comparing the average brightness levels added by said average brightness level adding device with a predetermined reference value;

a multiplication coefficient setting device for setting the multiplication coefficient on the basis of a comparison result of said comparing device; and a multiplying device for multiplying the RGB digital color signals outputted from said A/D converting device with the multiplication coefficient set by said multiplication coefficient setting device respectively, and outputting the multiplied signals to a display apparatus so that said display apparatus displays a video image corresponding to the RGB digital color signals on the basis of the multiplied RGB digital color signals, said multiplication coefficient setting device setting the multiplication coefficient so as to limit the brightness level of the video signal for each frame of the video image on the basis of the comparison result, wherein groups each including the at least two of blocks adjacent to each other are defined as block groups respectively, said average brightness level adding device adds to each other the average brightness levels in the blocks within respective one of the block groups for each of the block groups. to thereby calculate the added average brightness level for each of the block groups, said multiplication coefficient setting device sets the multiplication coefficient so as to limit the brightness level if the added average brightness level in at least one of the block groups is larger than the predetermined reference value.

10. A brightness controlling apparatus according to claim 9, wherein said blocks comprise blocks obtained by dividing the brightness signal to be displayed on the picture plane in a vertical direction.

11. A brightness controlling apparatus according to claim 9, wherein said blocks comprise blocks obtained by dividing the brightness signal to be displayed on the picture plane in a horizontal direction.

12. A brightness controlling apparatus according to claim 9, wherein said blocks comprise blocks obtained by dividing the brightness signal to be displayed on the picture plane in both of vertical and horizontal directions.

13. A brightness controlling apparatus according to claim 9, wherein said brightness level setting device gradually varies the brightness level in correspondence with the added average brightness levels.

14. A brightness controlling apparatus according to claim 9, wherein said average brightness level adding device adds to each other the average brightness levels of the brightness signal in at least two of the blocks adjacent to each other.

15. A brightness controlling apparatus according to claim 9, wherein said average brightness level adding device adds the average brightness level of the brightness signal in one of the blocks to the average brightness levels of the brightness signal in another blocks surrounding said one of the blocks.

* * * * *